Patented Dec. 2, 1952

2,620,275

UNITED STATES PATENT OFFICE 2,620,275

MALT BEVERAGES AND METHOD OF STABILIZING THE SAME

Philip P. Gray, Forest Hills, N. Y., assignor to Wallerstein Company, Inc., New York, N. Y., a corporation of New York No Drawing. Application October 13, 1948, Serial No. 54,369

14 Claims. (Cl. 99—48)

This invention relates to a method of preparing malt beverages, particularly beer and ale, which provides an increased resistance to the deleterious effects of air and oxidation and to the stabilized beverages produced by such method.

It is now an established and well-known fact that contact of beer with air has a deleterious effect upon the flavor, color, brilliance and over-all shelf life of the finally packaged product. Such contact between beer and air may arise from the presence of unavoidable amounts of dissolved air in the beer during storage prior to packaging. This may be further increased by additional quantities of air entering the package from the atmosphere immediately prior to capping during filling operations. Small degrees of oxidation may produce very appreciable changes in the quality of the products.

In U. S. Patent No. 2,159,985 issued May 30, 1939, to Philip P. Gray and Irwin Stone of New York, a method is given to combat and retard the effects of oxidation of beer and ale. In this method ascorbic acid and related compounds having an en-diol grouping are employed. Other materials capable of similarly reducing the oxidation-reduction potential of beers and ales, and which are non-toxic and do not unfavorably affect the flavor, taste, appearance and other properties of these materials, may be used in addition to or in lieu of ascorbic acid. For example, stereo-isomers of ascorbic acid and the analogues of ascorbic acid prepared from sugars having more, or less, than six carbon atoms may be used. Other examples are reductone, at one time called glucic acid, and other so-called reductones. These represent a class of compounds that have marked reducing properties and are obtained from sugars by the action of alkali under suitable conditions. So-called reductinic acid and similar compounds derived from sugars may also be used.

These various materials are all characterized by their common property of effecting a substantial lowering of the oxidation-reduction potential of beer when added in small amounts. These several materials referred to are further characterized in that they have, according to the present chemical knowledge, the common structural group

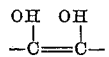

namely, the en-diol.

Of these materials that possess the reducing and other desired properties, ascorbic acid is presently considered to effect the desired results most advantageously.

The amount of ascorbic acid required to carry out the process of the patent depends to some extent on the beer, the air content, the length of storage encountered, the conditions of storage, and the extent of the protection desired. The patent suggests that ascorbic acid compounds should be present in some excess over the amount that would be normally oxidized as a result of the several factors mentioned. It is also pointed out that larger amounts give more protection and there is no harmful or undesirable effect from a considerable surplus so that technically there is no upper limit to the amount that may be used.

A very important obstacle to the wide-spread adoption of this procedure is the high cost of the ascorbic acid used in the treatment. This cost has tended to limit the quantities of ascorbic acid used to such inadequate amounts that the additive does not afford adequate protection.

Accordingly, it is an important object of the present invention to make possible the incorporation of ascorbic acid and other expensive derivatives in beer on a more economical basis.

It has been found that improved stabilization of malt beverages can be obtained by using considerably less ascorbic acid and related compounds if the ascorbic acid or related compounds are used in combination with catalase. Extremely small amounts of catalase, in combination with the ascorbic acid or related compound, impart an increased anti-oxidant effect to the beverage even when considerably lower amounts of ascorbic acid than required by the process of the above cited patent are added. The amount of catalase used in combination with ascorbic acid is extremely small and may be added at any time subsequent to the brewing stage and prior to the packaging of the beer. Indeed, it is not necessary that the ascorbic acid and the catalase be added simultaneously but the addition of either one may precede the addition of the other prior to the packaging of the beer.

Catalase is an enzyme which, for example, catalyzes the reaction.

$$2H_2O_2 \rightarrow 2H_2O + O_2$$

This enzyme may be obtained from plant, animal, or microbiological sources and may be prepared in the form of a substantially purified concentrate.

Inasmuch as enzymes are not commercially employed in pure form, the amount added will depend upon the activity of the preparation used. A simple test for estimating catalase activity is based on the ability of catalase to liberate $O_2$ from a hydrogen peroxide substrate. Such tests may be conducted in the so-called Smith fermentation tube (A. P. H. A. Standard). This tube is commonly used in bacteriological laboratories for the detection of gas-forming microorganisms and consists of a bulb of 25 to 30 ml. capacity having a gas collection tube attached. The gas collection tube is graduated so that the gas volumes may be read off. Twenty ml. of the sample to be assayed (or a suitable aliquot diluted to 20 ml.) is placed in the Smith tube and attemperated to 10° C. 2 ml. of 10% $H_2O_2$ (33 ml. 30% $H_2O_2$ plus 25 ml. Walpole acetate pH 4.5 buffer diluted to 100 ml. with water) at 10° C. is added. The contents of the tube are mixed and the tube is inverted to fill the side arm. The tube is kept at 10° C. for 3 hours after which time the volume of the evolved gas is read. If more than 2 ml. of gas is evolved the test is repeated using a correspondingly lower aliquot of sample.

One unit of catalase activity is here defined as that amount of enzyme needed to evolve 1 ml. of gas under the conditions of the test described in the previous paragraph.

It has been found that when catalase is added to ascorbic acid or similarly treated beer in amounts such that 20 ml. of sample when tested by the above procedure gives about 0.5 to 4.0 units of catalase activity, satisfactory results will be obtained. This range, of course, is only approximate and will vary somewhat depending upon the particular beer and also on the amounts of ascorbic acid coincidentally employed.

The requirements for ascorbic acid when used in conjunction with catalase will range from about 1 pound of ascorbic acid per 100 barrels of beer of 31 gals. to 1 lb. per 400 barrels of beer. When ascorbic acid is used without the catalase, the requirements will exceed 1 pound of ascorbic acid per 100 barrels of beer. The economic advantages of this process hence are obvious.

By way of example, 0.5 pound of ascorbic acid and 0.3 pound of catalase are added to 100 bbls. of beer just prior to bottling. The catalase used has an activity of 1,950,000 units per pound as determined by the Smith tube testing procedure hereinbefore described. The beer so treated has a catalase content of about 1 unit per 20 ml. and develops only a very slight haze when stored in capped bottles for four months at 30° C. and thereafter chilled to 0° C. for 12 hours, whereas an untreated control sample stored under identical conditions and thereafter similarly chilled develops a pronounced haze.

It has been found, over a range of varying concentrations and combinations of these combined reagents in beer, that an equal or better protection is obtained, for example, when 8 parts of ascorbic acid are replaced by only 2 to 4 parts of ascorbic acid in combination with 1 to 2 parts of a catalase preparation having an activity as described in the example of the previous paragraph. In general, when ascorbic acid and catalase are employed conjointly, the amount of ascorbic acid required to confer a given degree of protection to the beer can be reduced to from about one-quarter to one-half the amount required when ascorbic acid is used alone. Under such conditions, the weight of catalase preparation of the strength employed in the example given hereinbefore may be about one-half the weight of the ascorbic acid used.

Iso-ascorbic acid can be substituted on an approximately equal weight basis for ascorbic acid in the practice of the invention.

Instead of using ascorbic acid, iso-ascorbic acid or others of the compounds containing the en-diol group, their beer soluble salts such as the sodium salts may be satisfactorily and efficiently used.

The proportions of catalase preparation designated herein are by way of example only and are based upon presently available commercial preparations. Other commercial preparations or more highly purified forms of catalase may be used in amounts inversely proportional to their relative activities as measured by their ability to decompose hydrogen peroxide under standard conditions.

I claim:

1. The method of stabilizing brewed malt beverages such as beers and ales against the deleterious effects of oxidation which comprises adding to the beverage subsequent to the brewing stage and prior to final packaging a catalase material and a compound having reducing properties and characterized by the en-diol group.

2. The method of stabilizing brewed malt beverages such as beers and ales against the deleterious effects of oxidation which comprises adding to the beverage subsequent to the brewing stage and prior to final packaging a catalase material and a substance selected from the group consisting of ascorbic acid, stereoisomers and analogues of ascorbic acid, reductones and reductinic acid.

3. The method of stabilizing brewed malt beverages such as beers and ales against the deleterious effects of oxidation which comprises adding to the beverage subsequent to the brewing stage and prior to final packaging a catalase material and an ascorbic acid.

4. The method of stabilizing brewed malt beverages such as beers and ales against the deleterious effects of oxidation which comprises adding to the beverage subsequent to the brewing stage and prior to final packaging a catalase material and an ascorbic acid.

5. The method of stabilizing brewed malt beverages such as beers and ales against the deleterious effects of oxidation which comprises adding to the beverage subsequent to the brewing stage and prior to final packaging a catalase material in amount sufficient to impart to the beverage a catalase activity of from 0.5 to 4.0 units per 20 ml. sample and a compound having reducing properties and characterized by the en-diol group.

6. The method of stabilizing brewed malt beverages such as beers and ales against the deleterious effects of oxidation which comprises adding to the beverage subsequent to the brewing stage and prior to final packaging a catalase material in amount sufficient to impart to the beverage a catalase activity of from 0.5 to 4.0 units per 20 ml. sample and from 0.25 pound to 1 pound of ascorbic acid per 100 barrels.

7. A brewed malt beverage such as beer and ale stabilized against the deleterious effects of oxidation containing a catalase material and a compound having reducing properties and characterized by the en-diol group, the catalase material having been added to the beverage subsequent to the brewing stage.

8. A brewed malt beverage such as beer and ale stabilized against the deleterious effects of oxidation containing catalase in an amount sufficient to impart to the beverage a catalase activity of from 0.5 to 4.0 units per 20 ml. sample and from 0.25 pound to 1 pound of ascorbic acid per 100 barrels, the catalase having been added to the beverage subsequent to the brewing stage.

9. The method of stabilizing brewed malt beverages such as beers and ales against deleterious effects of oxidation which comprises adding to the beverage subsequent to the brewing stage and prior to final packaging a catalase material and isoascorbic acid.

10. The method of stabilizing brewed malt beverages such as beers and ales against the deleterious effects of oxidation which comprises adding to the beverage subsequent to the brewing stage and prior to final packaging a catalase material in amount sufficient to impart to the beverage a catalase activity of from 0.5 to 4.0 units per 20 ml. sample and from 0.25 pound to 1 pound of iso-ascorbic acid per 100 barrels.

11. A brewed malt beverage such as beer and ale stabilized against the deleterious effects of oxidation containing catalase and iso-ascorbic acid, the catalase having been added to the beverage subsequent to the brewing stage.

12. A brewed malt beverage such as beer and ale stabilized against the deleterious effects of oxidation containing catalase in an amount sufficient to impart to the beverage a catalase activity of from 0.5 to 4.0 units per 20 ml. sample and from 0.25 pound to 1 pound of iso-ascorbic acid per 100 barrels, the catalase having been added to the beverage subsequent to the brewing stage.

13. The method of stabilizing brewed malt beverages such as beers and ales against the deleterious effects of oxidation which comprises adding to the beverage subsequent to the brewing stage and prior to final packaging a catalase material and a salt soluble in the beverage, having reducing properties and characterized by the en-diol group.

14. A brewed malt beverage such as beer and ale stabilized against the deleterious effects of oxidation containing a catalase material and a salt dissolved in the beverage, having reducing properties and characterized by the en-diol group, the catalase material having been added to the beverage subsequent to the brewing stage.

PHILIP P. GRAY.

REFERENCES CITED

The following references are of record in the file of this patent:

UNITED STATES PATENTS

| Number | Name | Date |
| --- | --- | --- |
| 2,097,516 | Coe | Nov. 2, 1937 |
| 2,159,985 | Gray et al. | May 30, 1939 |

OTHER REFERENCES

Olson, F. C., and W. C. Brown: "Oxidized Flavor in Milk XI," Journal of Dairy Science, vol. 25, July-December 1942, pages 1027, 1028, 1036, to 1038, 1041 to 1050.

Anderson, J. A.: "Enzymes, and Their Role in Wheat Technology," published 1946 by Interscience Publishers Inc., New York, pages 216 to 221.